United States Patent [19]
Takakura et al.

[11] Patent Number: 6,057,825
[45] Date of Patent: May 2, 2000

[54] IMAGE PROCESSING APPARATUS WITH PAINT-IN OF OUTLINE INTERIORS

[75] Inventors: Hiroshi Takakura, Yokohama; Takahiro Kato, Tokyo; Masaki Hamada, Yokohama; Kunio Seto, Inagi; Akifumi Shirasaka, Kawasaki, all of Japan

[73] Assignee: Canon Kabushiki Kaisha, Tokyo, Japan

[21] Appl. No.: 08/400,262

[22] Filed: Mar. 2, 1995

Related U.S. Application Data

[63] Continuation of application No. 08/113,316, Aug. 30, 1993, abandoned, which is a continuation of application No. 07/851,240, Mar. 13, 1992, abandoned, which is a continuation of application No. 07/398,493, Aug. 25, 1989, abandoned.

[30] Foreign Application Priority Data

Aug. 26, 1988 [JP] Japan .................................. 63-210450
Aug. 26, 1988 [JP] Japan .................................. 63-210451
Aug. 26, 1988 [JP] Japan .................................. 63-210452

[51] Int. Cl.$^7$ .................................................. G09G 3/36
[52] U.S. Cl. .......................... 345/133; 345/135; 345/144
[58] Field of Search ................................. 345/133, 189, 345/203, 141–144; 358/447

[56] References Cited

U.S. PATENT DOCUMENTS

| | | | |
|---|---|---|---|
| 4,754,488 | 6/1988 | Lyke | 340/747 X |
| 4,815,009 | 3/1989 | Blatin | 340/747 X |
| 4,817,172 | 3/1989 | Cho | 345/144 |
| 4,914,729 | 4/1990 | Omori et al. | 340/747 X |
| 4,962,468 | 10/1990 | Beauregard et al. | 340/747 X |
| 5,151,794 | 9/1992 | Kumagai | 358/447 |

FOREIGN PATENT DOCUMENTS 60-132271  11/1985  Japan .

OTHER PUBLICATIONS

Bruce Mielke, "Integrated Computer Graphics," 1991, West Publishing Co., pp 56,57,241,242.

*Primary Examiner*—Amare Mengistu
*Attorney, Agent, or Firm*—Fitzpatrick, Cella, Harper & Scinto

[57] ABSTRACT

An image processing apparatus for drawing the inside of an image area which is expressed by vector data has reversal and painting means for sequentially reversing write dots (data) along the storage direction in correspondence to one outline which is specified by vector data, for writing the reversed write dots into an image memory, and for painting the inside of an image area like a closed figure in the image memory. Thus, the area in a closed figure can be painted at a high speed using an apparatus which has a simple construction. The optimum reversal and painting method can be selectively switched in accordance with the attribute data of an image area to be painted, so that the optimum. painting process can be executed at a high precision and at a high speed.

28 Claims, 17 Drawing Sheets

F I G. 2
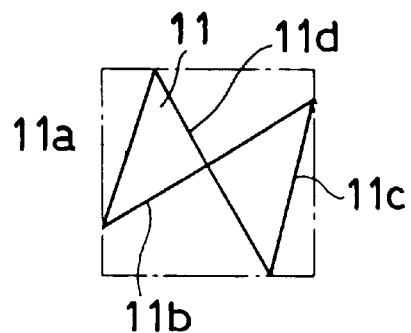
F I G. 3(a)   F I G. 3(b)
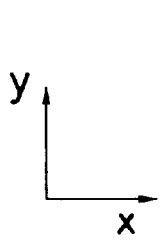 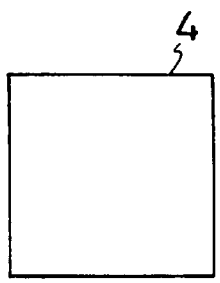 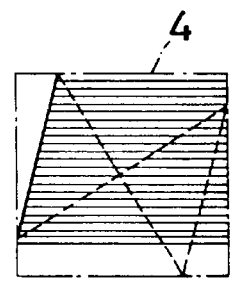
F I G. 3(c)   F I G. 3(d)   F I G. 3(e)
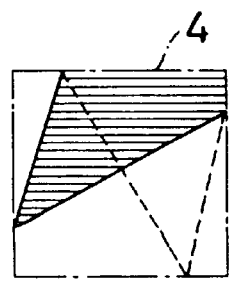 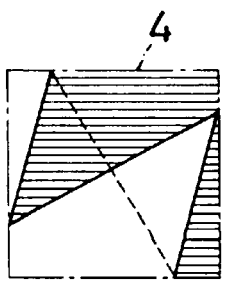 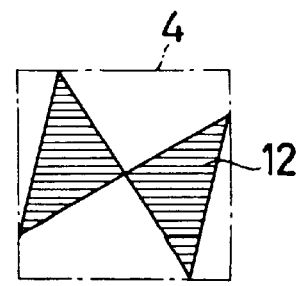

32

31

MID

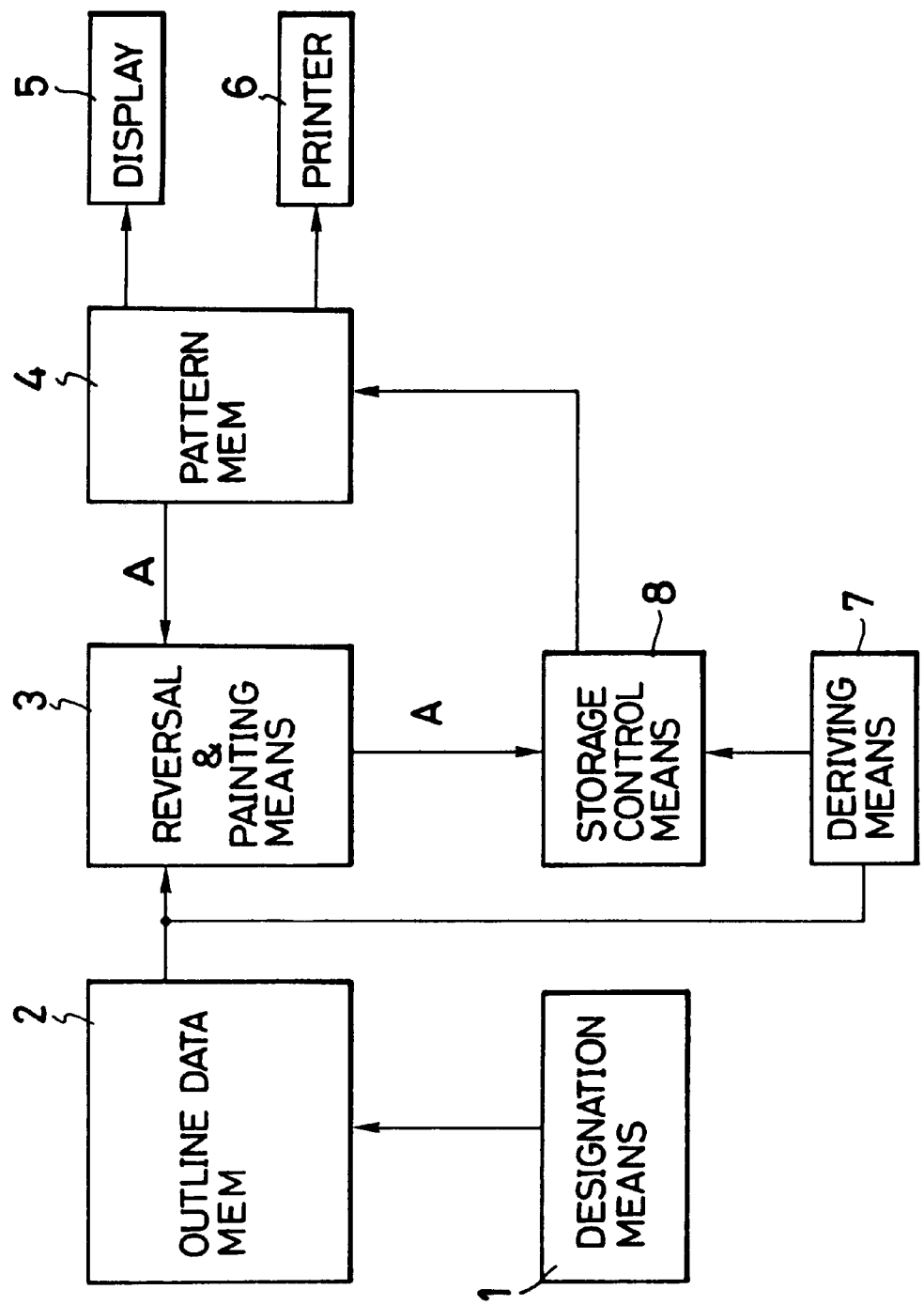

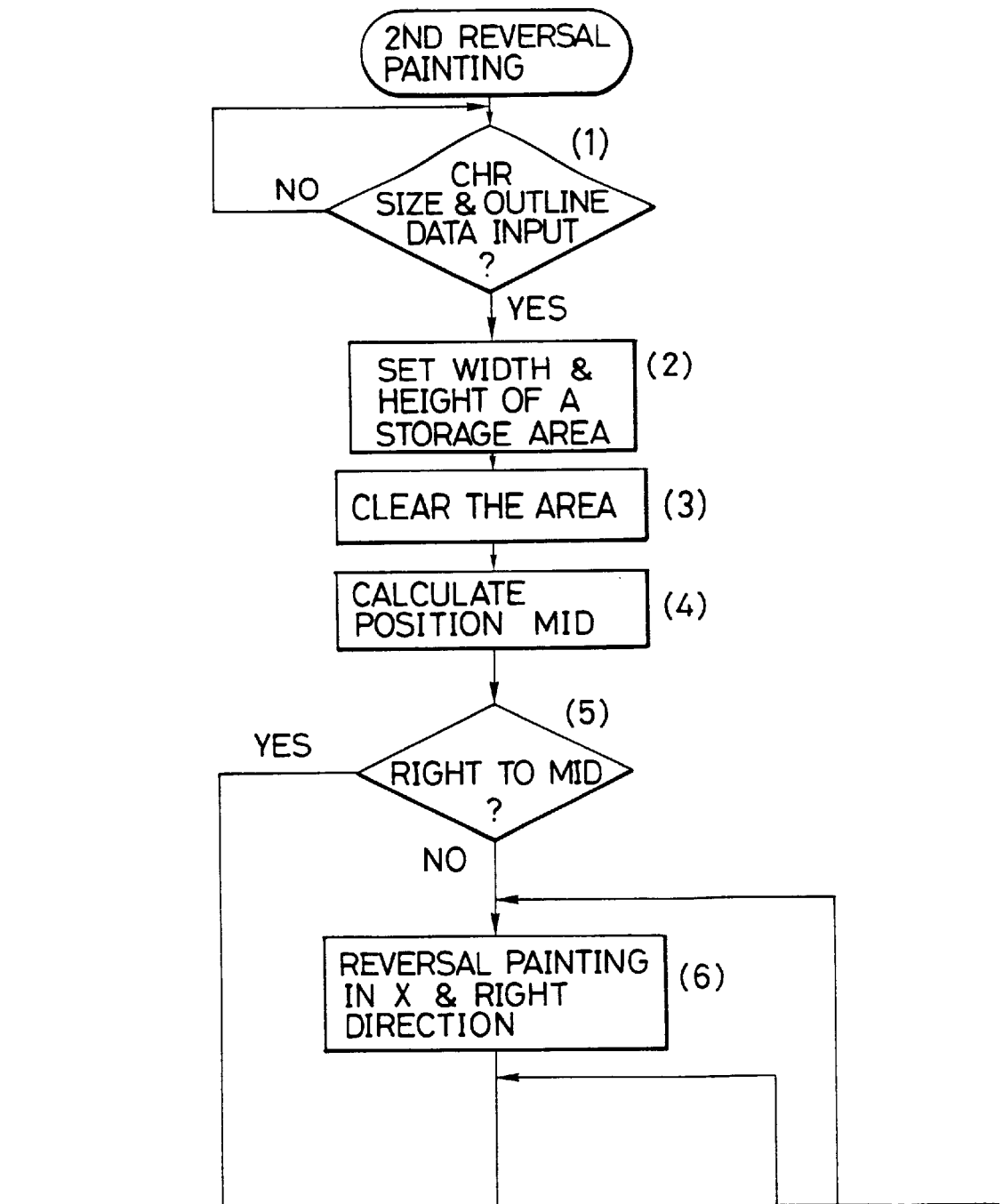

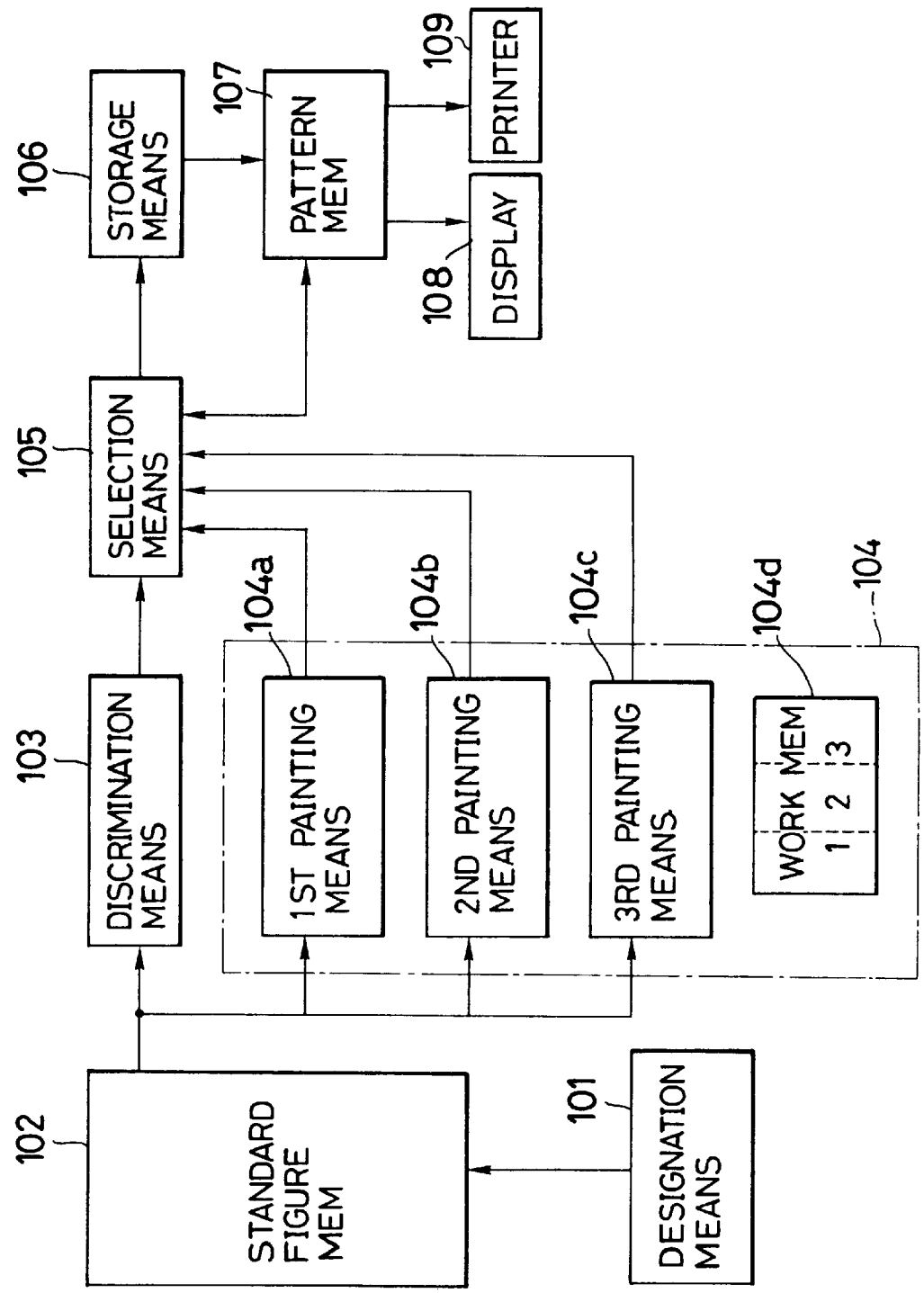

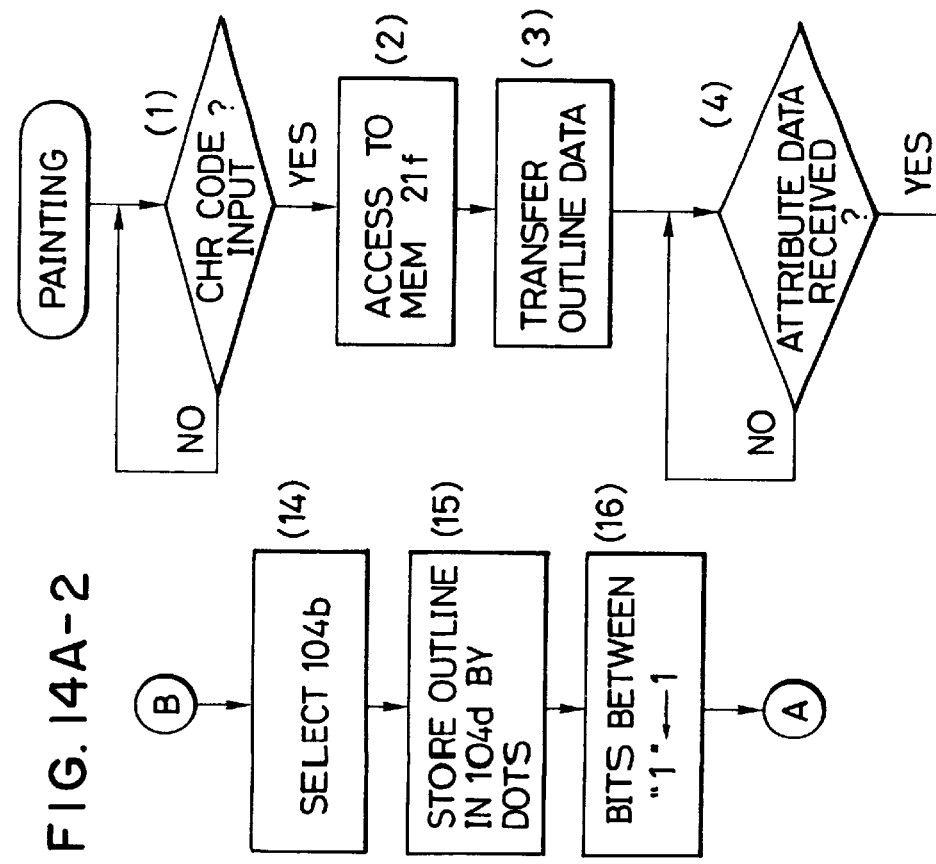

FIG. 15(a)
PRIOR ART
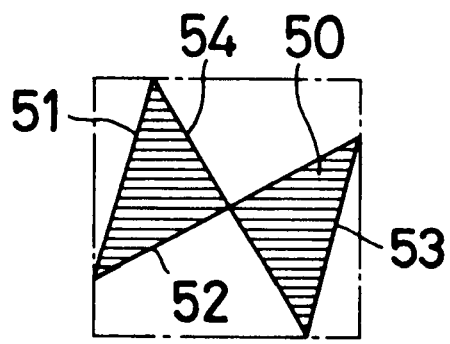
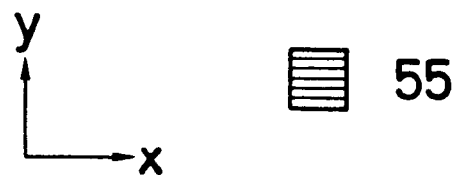
FIG. 15(b)
PRIOR ART
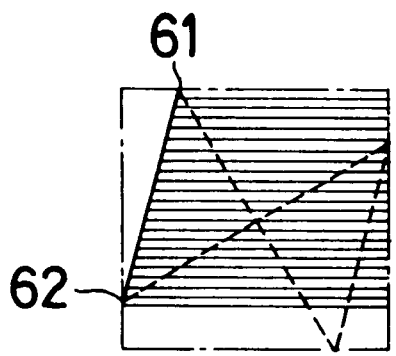
FIG. 15(c)
PRIOR ART
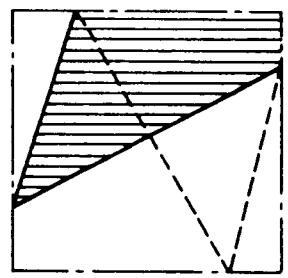
FIG. 15(d)
PRIOR ART
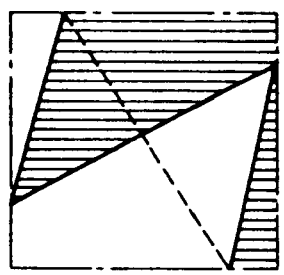
FIG. 15(e)
PRIOR ART
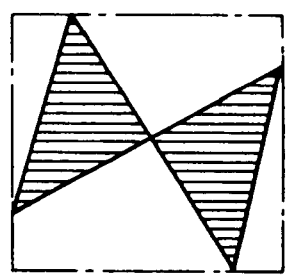

IMAGE PROCESSING APPARATUS WITH PAINT-IN OF OUTLINE INTERIORS

This application is a continuation of application Ser. No. 08/113,316, filed Aug. 30, 1993, now abandoned, which was a continuation of application Ser. No. 07/851,240, filed Mar. 13, 1992, now abandoned, which was a continuation of application Ser. No. 07/398,493, filed Aug. 25, 1989, now abandoned.

BACKGROUND OF THE INVENTION

1. Field of the Invention

The present invention relates to an image processing apparatus for drawing the inside of an image area which is expressed on the basis of vector data.

2. Related Background Art

Hitherto, as an image processing system according to an internal drawing of an area, as shown in JP-A-60-132271 or the like, there has been proposed a typical method in the case of writing into a memory on the basis of the exclusive OR process applied to boundary line data and a predetermined painted pattern. As shown in JP-A-50-14230, there has been proposed a typical method in the case of painting a pixel into a memory corresponding to an interval between 1 and 1 of the dots on a scanning line which are obtained by scanning outline data. As shown in "COMPUTER GRAPHICS", The Society of Japan Computer, pages 466 to 472, Jul. 15, 1984, there has been proposed a typical method in the case of painting a pixel into a memory on the basis of an outline table or the like which has been formed for that purpose.

FIGS. 15(a) to 15(e) are diagrams for explaning an example of a closed figure painting process. In FIG. 15(a), a closed figure 50 is constructed by four boundary lines 51 to 54. Reference numeral 55 denotes painted portions. Painting is executed by the exclusive OR process applied to the painted pattern 55 and the boundary lines 51 to 54.

The boundary lines 51 to 54 constructing the closed figure 50 are expressed by three or more vector data in which a start point 61 and an end point 62 are used as parameters. A painting range (in the area surrounded by the alternate long-and-short-dash line in the diagram) is specified on the basis of the parameters of the start point and end point of the vector data.

According to the above system, the painted pattern is also written simultaneously with the boundary lines 51 to 54 being sequentially directly written into a full dot memory (not shown).

FIG. 15(b) shows a state in which only the boundary line 51 is written into the full dot memory and, at the same time, the painted pattern 55 is also written from the boundary line data. The boundary line 51 is drawn by generating dots one by one for the interval from the start point 61 to the end point 62. At this time, the painted pattern 55 of one raster in the lateral direction (direction of an x axis) is written in the specified painting range from the adjacent dot position on the right side upon generation of each dot. At this time, the exclusive OR of the pattern being written and the data which has already been written in the memory is calculated and written into the full dot memory. Therefore, if at a particular pid the pattern now being written is "1" and the data stored in the memory is "1", data "0" is written into the memory.

When dots are generated for the interval from the start point 61 to the end point 62 of the boundary lines 51 to 54, the dot data is sequentially written into the closed figure 50 by the exclusive OR processes as shown in FIGS. 15(b) to 15(e).

FIG. 16 is a diagram for explaining the closed figure painting principle. Reference numeral 65 denotes a memory and this diagram corresponds to the state in which a closed figure 66 is stored.

Reference numeral 77 denotes a scanning line. The data "0" between the crossing positions of the scanning line 77 with the closed figure 66, that is, the "0" signals for the intervals of ①–②, ③–④, and ⑤–⑥ in FIG. 16, are converted into "1" signals and the painting process on one line is executed. The area in the closed figure 66 is painted out by sequentially executing the above painting process in the scanning direction.

However, the above conventional painting process has the following problems.

In the painting process for converting the "0" signals between the "1" signals on the scanning line into the "1" signals, process and the hardware construction are simple. However, in, a case where the scanning line and the vertices of the outline cross, that is, if the number of crossing points with the outline is an odd number, painting is not correctly executed. Therefore, an-exceptional process must be performed at such points and the processing time depends on the shape of the figure.

On the other hand, in the case of executing the painting process by the exclusive OR process, since the logic arithmetic operating time per unit dot is long, in many cases, the overall processing speed becomes slow. In addition, it is troublesome to deal with the painted pattern.

Further, in the painting process carried out using an outline table, as the figure shape becomes more complicated, the number of outline points also increases. However, if the number of outline points exceeds the set outline table capacity, a predetermined process to thin out the number of outline points is executed. Thus, there are problems such that an approximate figure shape different from the original figure shape is painted, and the print quality is deteriorated and the like.

FIG. 17 is a diagram for explaining the painting process which was an outline table.

FIG. 18 is an explanatory diagram showing a polygonal outline table which is defined by vectors shown in FIG. 17.

As will be understood from the diagrams, in the case of painting a figure 80 surrounded by vectors $e_1$ to $e_6$, all of the vectors $e_1$ to $e_6$ are first set into the downward directions as shown in FIG. 17. Next, an outline table 81 as shown in FIG. 18 is formed. After sorting by the y coordinate having a smaller-vector for each y coordinate, the vectors starting from such a y coordinate are linked, thereby forming the outline table 81. Data of a vector to be linked includes: the maximum value of the y coordinate values of the vector; the minimum value of the x coordinate values and its change amount; a pointer of the next vector; and the like. For the outline table 81 formed as mentioned above, evaluation is sequentially executed in accordance with the order from the small y coordinate. The portion sandwiched by two vectors, for instance, the intervals on the scanning line shown in FIG. 16 (the interval from 2 to 4 and the interval from 7 to 13 as x coordinate values) are painted out.

However, the above conventional painting process has the following problems.

In the printing process to convert the "0" signals between the "1" signals on the scanning line into the "1" signals, process and hardware construction are simple. However, it is necessary to use a memory to previously store the outline for its processing, so that a memory of a large capacity is needed to paint a large closed figure. In addition, as a result of the necessity of such a memory, the costs of the hardware circuits rise substantially. Further, in the-case where the scanning line and the vertices of the outline cross, that is, if the number of crossing points with the outline is an odd number, an exceptional process must be executed at such points.

On the other hand, in the case of executing the painting process by the exclusive OR process, since the process is simple, the processing speed is fast. However, since the exclusive OR is also calculated in c portion which does not need to be painted, although a-problem hardly occurs in the case of a small figure, if a size of figure is large, the reversal area increases in proportion to the square, so that the processing time becomes extremely long. On the other hand, if a figure becomes complicated, the number of reversal times increases and the processing time becomes long.

Further, in the painting process using the outline table, although a figure of a large size can be painted by using a memory of a relatively small capacity, it takes a long time for processing. Moreover, as the figure shape becoes complicated, the number of outline points, that is, the number of vectors constructing a polygon, increases. If the number of outline points exceeds the set outline table capacity, a predetermined process to thin out the number of outline points is executed, so that there are problems such that an approximate figure shape different from the original figure shape is painted, the print quality is deteriorated, and the like.

SUMMARY OF THE INVENTION

In consideration of the above problems, it is an object of the present invention to provide an image processing apparatus having reversal and painting means for writing while sequentially reversing write dots in a pattern memory along a storage direction in correspondence to one outline which is specified by vector data and for painting the area in a closed figure.

In consideration of the above problems, another object of the invention is to provide an image processing apparatus in which by sequentially reversing write dots (data) in a pattern memory until a predetermined storage line in correspondence to one outline which is specified by vector data, the area in a closed figure can be painted at a high speed by a simple construction.

In consideration of the above problems, still another object of the invention is to provide an image processing apparatus in which an attribute of an image to be painted is discriminated, and a method for a painting process can be selectively switched.

BRIEF DESCRIPTION OF THE DRAWINGS

FIG. 2 is a diagram showing an image area to be painted;

FIG. 3 is a diagram showing a state of the painting process;

FIG. 9 is a constructional block diagram for executing the process shown in FIG. 8;

FIG. 12 is a block diagram for executing an example in the case of switching the painting process in accordance with the kind of image area;

FIG. 14 is a flowchart showing a painting process in accordance with the kind of image area;

FIG. 15 is a diagram showing an example of a painting process of a closed figure;

DETAILED DESCRIPTION OF THE PREFERRED EMBODIMENTS

An embodiment of the present invention will be described in detail hereinbelow with reference to the drawings.
(Reversal and Painting)

Figure 1:
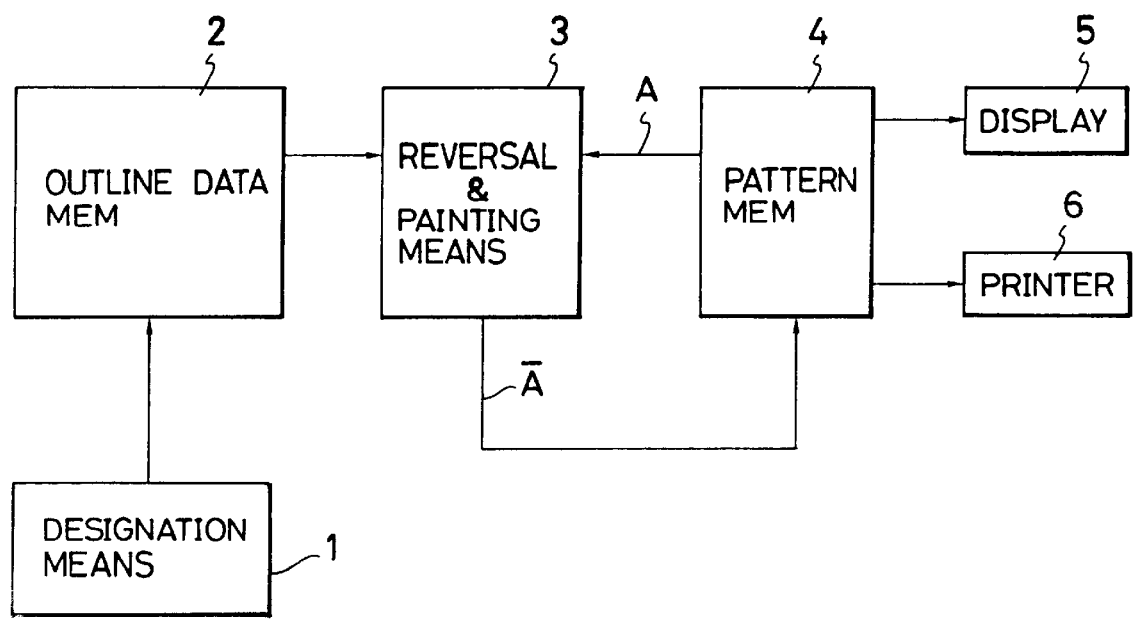
FIG. 1 is a constructional block diagram for painting an image area by executing a reversal process.

FIG. 1 is a block diagram for explaining a construction of an image processing apparatus showing an embodiment of the invention. Reference numeral 1 denotes designation means for designating a closed figure to be painted by a code or designating a closed figure drawn by a display 5. Reference numeral 2 indicates an outline data memory. A plurality of outline data constructing a closed figure have previously been stored as vector data in the memory 2. Or, vector data of a closed figure drawn by the display 5 is stored in the memory 2. In response to a code input from the designation means 1 or a figure instruction input by a cursor or the like, the vector data of a closed figure to be painted is output to reversal and painting means 3.

The reversal and painting means 3 sequentially reverses and writes write dots in the pattern memory 4 which face one outline which is specified by vector data along the storage direction and stores black dots into the closed figure in a pattern memory 4, thereby executing the painting process. The reversal and painting process denotes that each dot datum A in the pattern memory 4 is reversed (1→0, 0→1) and rewritten into the pattern memory 4.

A printer 6 prints dot data stored as a bit map in the pattern memory 4, as a dot image.

The first reversal and painting process according to the invention will now be described with reference to FIGS. 2 and 3.

Figure 11B:
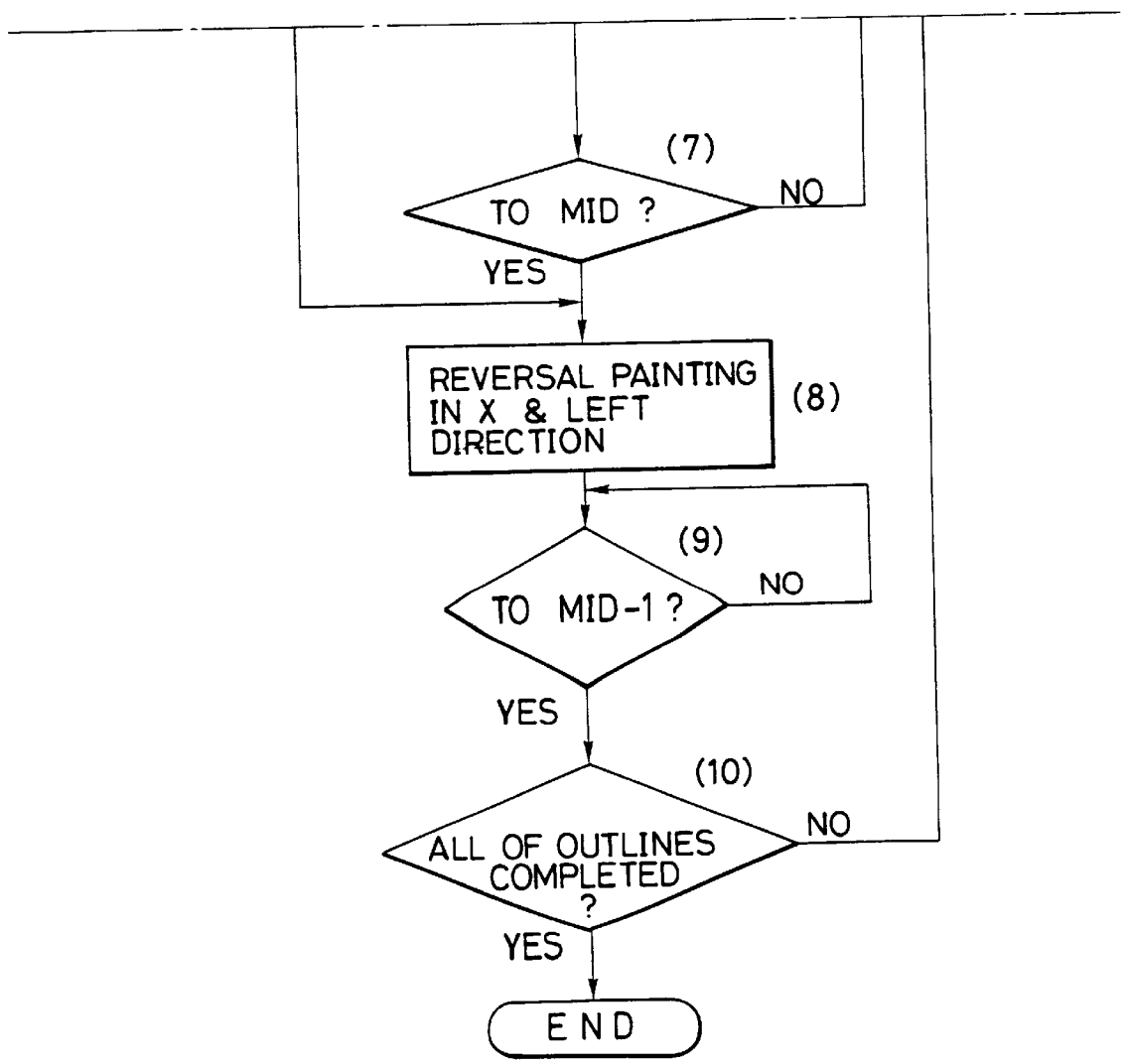
FIG. 11 is a flowchart for a reversal process using a storage line.

FIG. 2 is a diagram showing outlines of a figure to be painted. A closed FIG. 11 is constructed by outlines 11a to 11d. Vector data which specifies the outlines 11a to 11d is stored in the outline data memory 2.

FIG. 3 is a diagram showing a state of the reversal and painting process by the reversal and painting means 3 shown in FIG. 1. FIG. 3(a) shows a state before writing and corresponds to the state in which the initialization (all data "0") has been executed by the reversal and painting means 3. FIG. 3(b) shows a reversal and painting processing state at a first time and corresponds to the state in which each dot has been reversed and stored with respect to an x direction (writing direction) for the outline 11a. FIG. 3(c) shows a reversal and painting processing state at a second time and corresponds to the state in which each dot has been reversed and stored with respect to the x direction (writing direction) for the outline 11b. FIG. 3(d) shows a reversal and painting processing state at a third time and corresponds to the state in which each dot has been reversed and stored with respect to the x direction (writing direction) for the outline 11c. FIG. 3(e) shows a reversal and painting processing state at the fourth time and corresponds to the state in which each dot has been reversed and stored with respect to the x direction (writing direction) for the outline lid. Thus, a painted FIG. 12 is formed and stored.

First, when an instruction for the closed FIG. 11 is given by the designation means 1 by a code or cursor activity, the vector data which specifies the outlines 11a to 11d is transmitted from the outline data memory 2 to the reversal and painting means 3.

The reversal and painting means 3 initializes the pattern memory 4 as shown in FIG. 3(a) and executes the reversal and painting process for the outline 11a (refer to FIG. 3)(b). Next, the reversal and painting process for the outline 11b is executed. However, since the dot data shown in FIG. 3(b) has already been written in the pattern memory 4, if the reversal and painting process is executed for the outline 11b, the dots on the side of the writing direction of the outline 11b are reversed to "0" as shown in FIG. 3(c).

Next, when the reversal and writing process for the outline 11c is executed, as shown FIG. 3(d), the dots on the side of the writing direction of the outline 11c are reversed to "1". Further, when the reverse and writing process for the outline 11d is executed, as shown in FIG. 3(e), the dots on the writing direction side of the outline 11d are reversed from "1" to "0" or from "0" to "1". The painted FIG. 12 is stored into the pattern memory 4.

When a display or print request for the painted FIG. 12 stored is generated by the designation means 1, the painted FIG. 12 is displayed by the display 5 (however, it is thinned out in accordance with the resolution for display) or is output as a dot image by the printer 6.

Figure 4A:
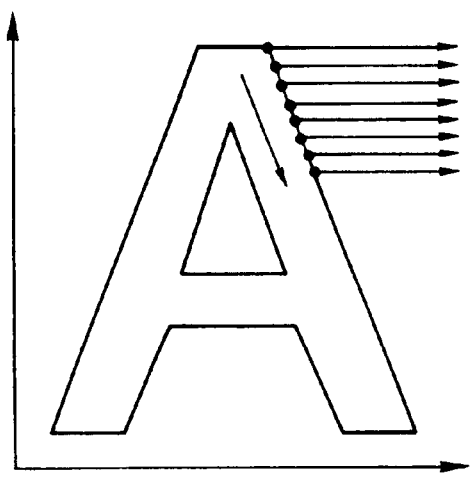
FIG. 4 is a diagram for explaining a paint blank phenomenon in the painting process.
Figure 4B:
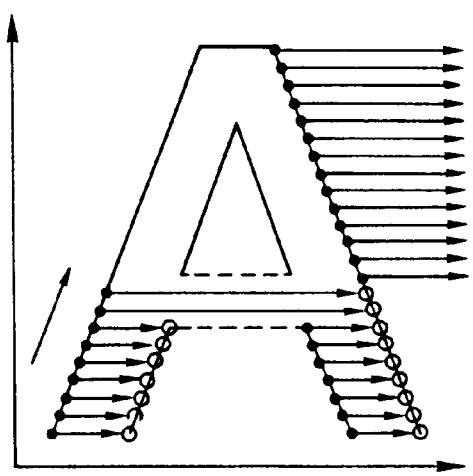
Figure 4C:
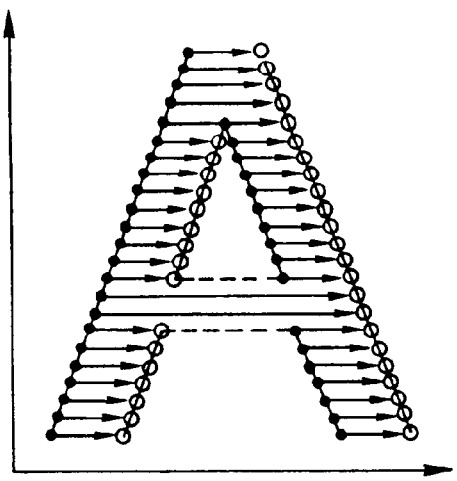

In the above reversal and painting process, there is a case where blank dots as shown in FIG. 4(a) to (c) are generated at each vertex or on the outline on the end side of the painting when the reversal and painting process is finished. Therefore, the painted FIG. 12 is written by shifting one dot in the painting scanning direction. FIGS. 4(a) to (c) are diagrams for explaining a paint blank phenomenon in the painting process ● indicates a painted (black) dot and ○ represents a paint blank dot.

As shown in FIGS. 4(a) to (c), when the above reversing process is executed while tracing the outlines in the direction of an arrow, the outline on the end side of the painting is extinguished. Therefore, to execute the painting process at a further high quality, it is necessary to draw the outline through a logical OR process after completion of the painting process. Or, upon tracing the end side, it is necessary to start the reversing process from the position which was shifted in the scanning direction by one dot. However, if such a painting process is executed, the vertex is not ultimately painted. Therefore, it is necessary to paint from the original position with respect to the vertex.

On the other hand, although the above embodiment has been described with respect to the case of executing the painting process for a simple figure to be painted, the above reversal and painting process can be also executed to the painting process of an outline font which is specified by vector data.

Figure 5:
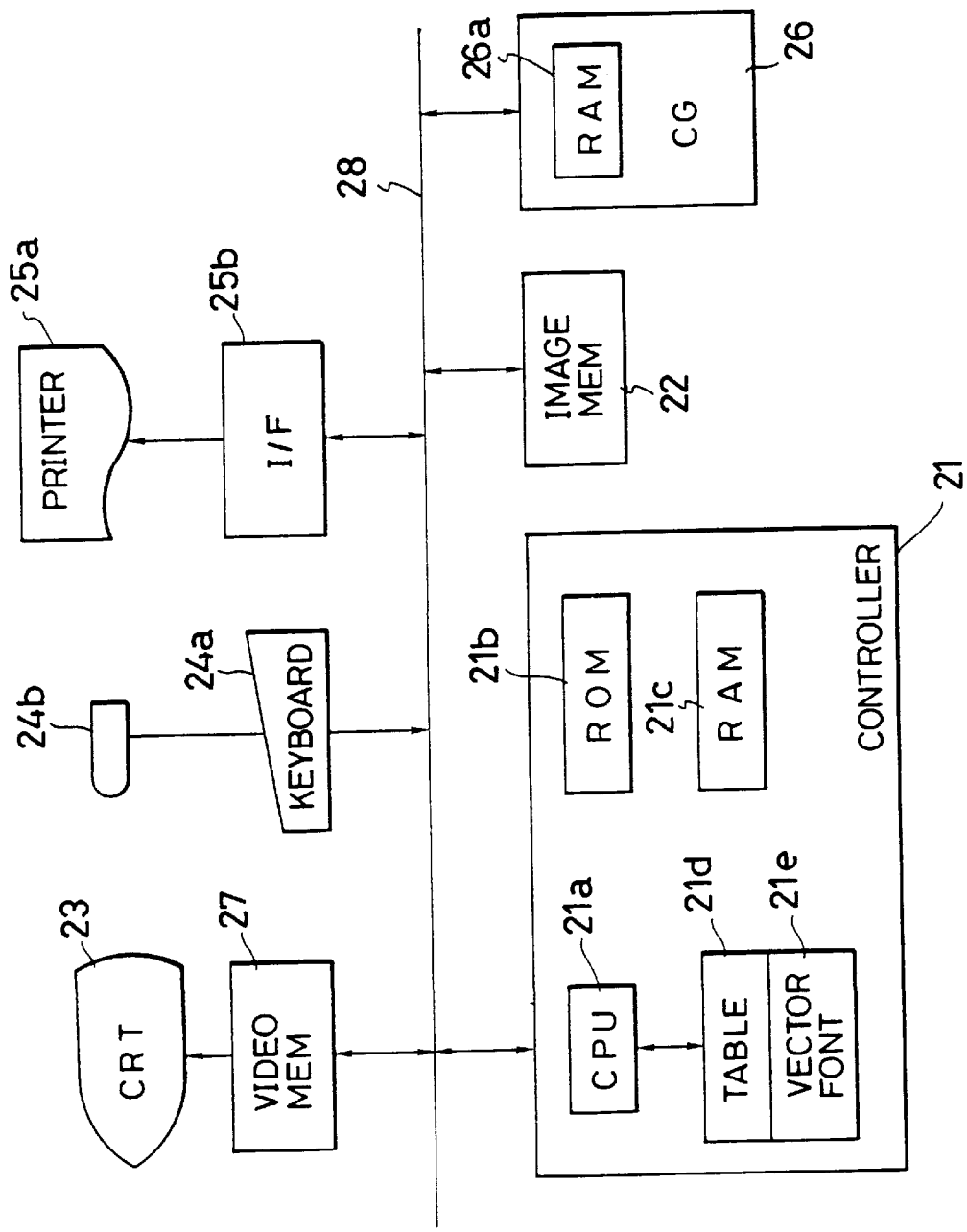
FIG. 5 is a diagram showing an example of a document apparatus for generating a vector font based on outline data.

FIG. 5 is a block diagram showing an example of a document apparatus for generating and outputting a vector font based on outline data. Reference numeral 21 denotes a controller having: a CPU 21a such as a microcomputer or the like; ROM 21b in which a control program for the CPU 21a, various data, and the like have been stored; RAM 21c for temporarily storing various data as a work area of the CPU 21a; a vector font memory (outline data memory) 21e; an address table 21d; and the like. The vector font data (vector data indicative of outlines of characters) of characters or the like corresponding to character codes have been stored together with attribute data in the vector font memory (outline data memory) 21e.

Addresses of the font data corresponding to codes of character patterns have been stored in the address table 21d.

Reference numeral 22 denotes an image memory which is constructed by a bit map. After outline character data comprising vectors are converted into dots by a character generator 26, the dot image of the character is stored. Thereafter, the dot image is sent to a printer 25a through an interface 25b and printed. On the other hand, the character generator 26 has a bit map memory RAM 26a. The RAM 26a functions as a work memory when developing from vectors to dots.

Reference numeral 24a denotes a keyboard and 24b indicates a pointing device which functions as a data input source of the document apparatus in cooperation with the keyboard 24a.

A CRT 23 display the bit image stored in a video memory 27 at a high accuracy. For instance, the vector data are stored as dots and transferred to the video memory 27.

The printer 25a prints the dot image received through the interface 25b. Reference numeral 28 indicates a bus.

Figure 6B:
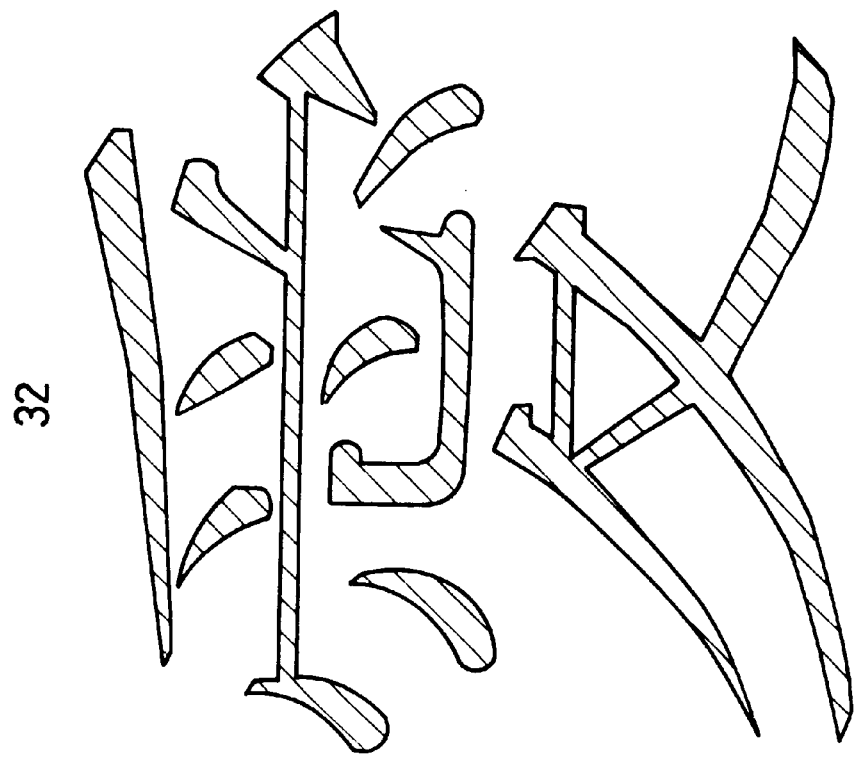
FIG. 6 is a diagram showing the relation between the vector font data which is stored into a vector font memory 21e and the output pattern.
Figure 6A:
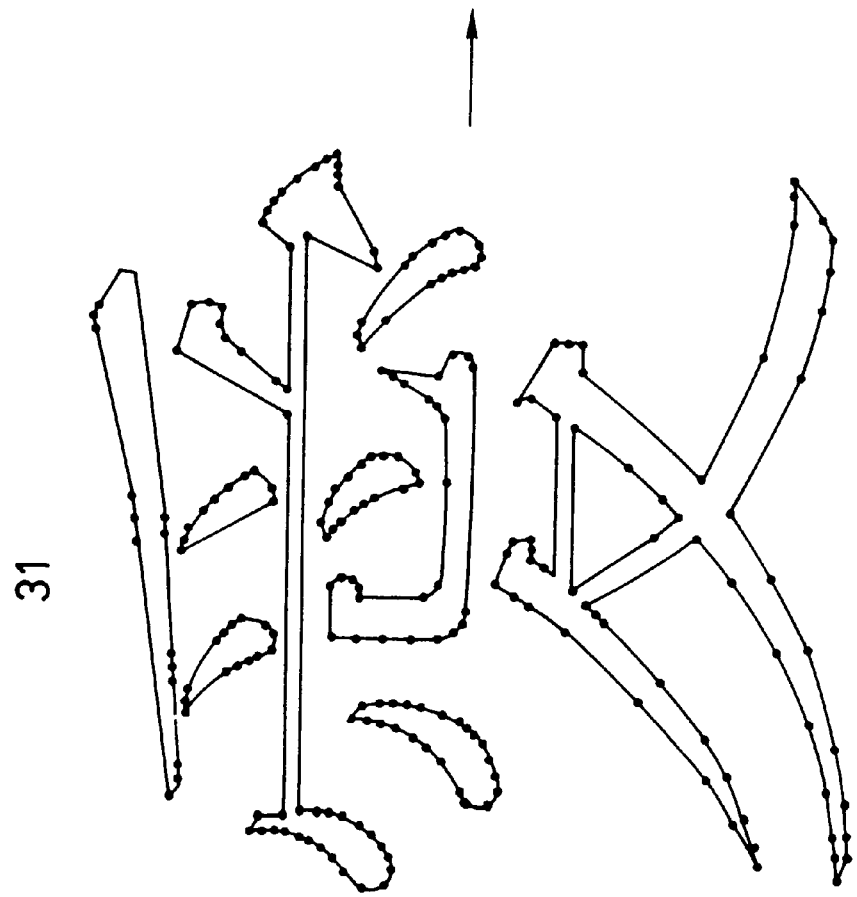

FIG. 6 is a diagram showing the corresponding relation between vector font data stored in the vector font memory (outline data memory) 21e shown in FIG. 5 and the print pattern. For instance, FIG. 6 shows the case where the character code indicates a character "愛" (which reads "ai" and means "love"), number "3026" in the JIS-C=6226 code system. Reference numeral 31 denotes vector font data and outline points (• in the diagram) of the character "愛" are stored as coordinate data. Reference numeral 32 denotes a print output character corresponding to the character which was output by executing the foregoing painting process to the outline specified by the vector font data 31.

A painting and outputting process based on the vector font data 31 will now be described with reference to FIG. 7.

Figure 7:
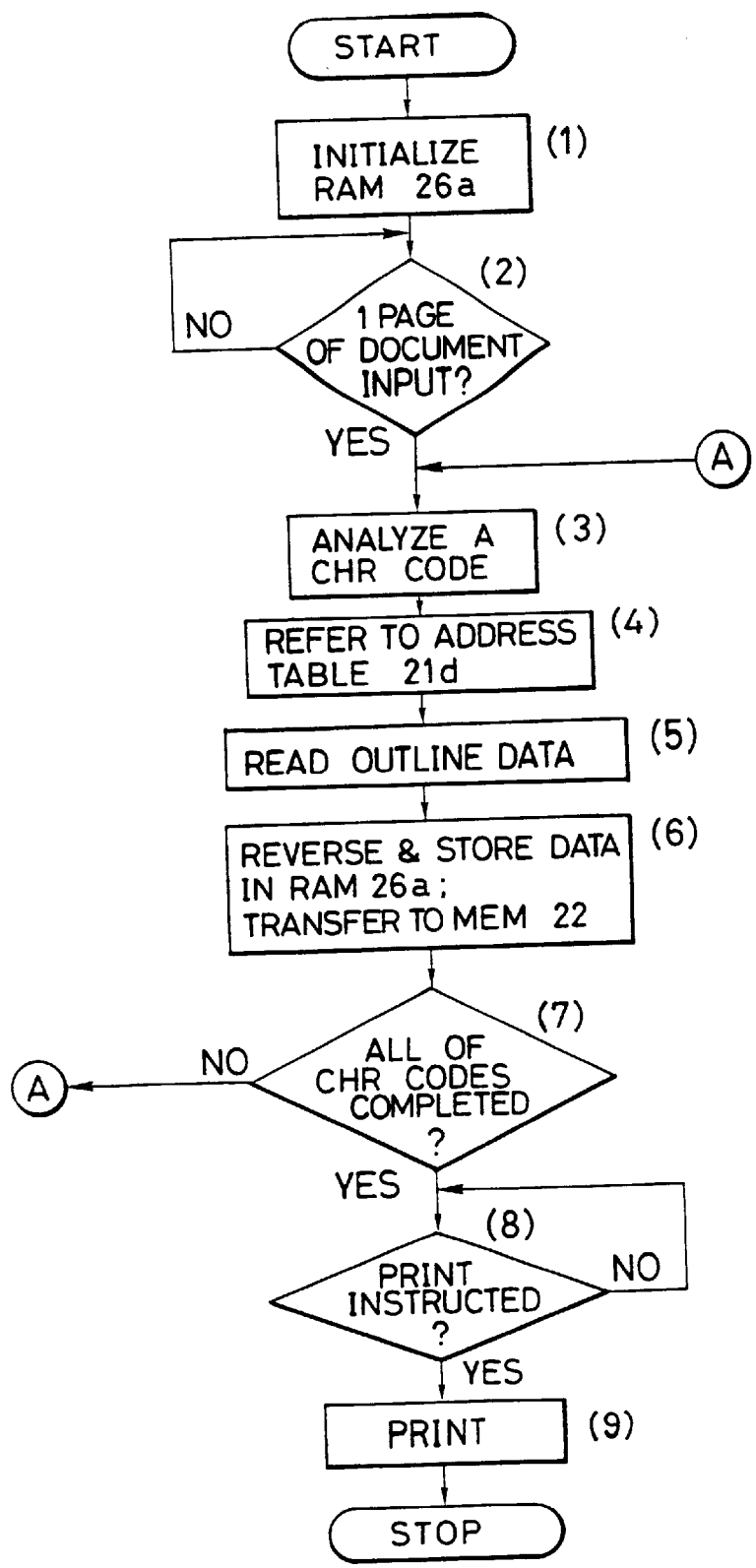
FIG. 7 is a flowchart for painting an image area by executing a reversal process based on vector font data 31.

FIG. 7 is a flowchart for explaining an example of the painting and outputting processing procedure based on the vector font data 31 according to the invention. Reference numerals (1) to (9) show processing steps, respectively.

First, in response to a command from the CPU 21a, the character generator 26 initializes the bit map memory RAM 26a (1) and waits until the document data of one page has completely been input (2). After completion of the initialization, the character code stored in the RAM 21c is analyzed (3). With reference to the address table 21d on the basis of the analyzed character code (4), a plurality of outline data are read out of the vector font memory 21e (5) and reversed and stored into the bit map memory RAM 26a and transferred to the image memory 22 (6). A check is then made to see if the reversing and storing processes have been completed for all of the outline data corresponding to all of the character codes or not (7). If NO, the processing routine is returned to step (3). If YES, the apparatus waits until a command to print the bit map data in the image memory 22 is input (8). If the print command has been input, the vector font data is transferred to the printer 25*a* and printed (9).

Due to this, as compared with the painting process by the conventional exclusive OR process, the processing performance can be greatly improved. The vector font can be displayed in the bit map or can be printed and output as a dot image at a high speed.

Figure 8:
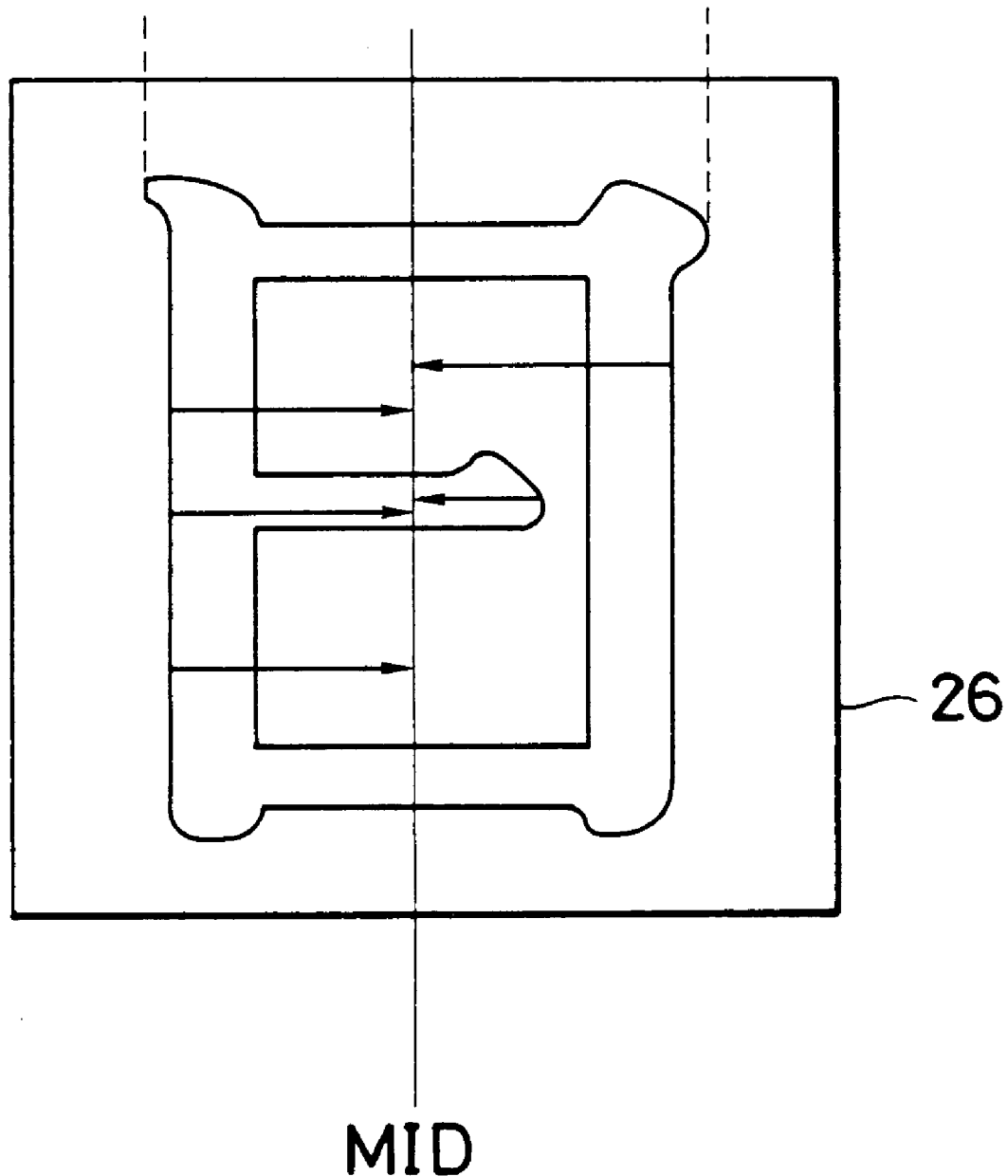
FIG. 8 is a diagram showing the case where the reversal process is executed until a certain storage line and a process to paint an image area is executed.

As shown in FIG. 8, when the character data of the outline font comprising vectors is stored as dots by the character generator 26, a middle point address is arithmetically operated from a head storage address and an end storage address in the storage direction in the bit map memory RAM 26*a* as a work memory. For the middle point address or an intermediate bit in the bit map area of, for instance, about 128 points which is set in the work memory, the painting process is executed in the direction of the middle point address or intermediate bit from the head storage address. The painting process is executed in the direction opposite to the direction of the middle point address or the intermediate bit from the end storage address. (Refer to FIG. 8,) Due to this, the painting process to the surplus address can be limited. Therefore, the painting process can be completed at a further higher speed than that in the above embodiment. The printing speed and display speed can be fairly improved.

As described above, the invention in this aspect comprises: a pattern memory to store a dot pattern; a vector data memory for storing vector data corresponding to a plurality of outlines which-construct a closed figure on a figure unit basis; and reversal and painting means for writing while sequentially reversing write dots in a pattern memory which faces one outline which is specified by the vector data read out of the vector data memory along the storage direction and for painting the area in the closed figure. Therefore, as compared with the conventional closed figure painting process, the painting process can be executed at a high speed by a fairly simple circuit. Thus, the process to paint a closed geometrical figure or the area in the vector font which is specified by a plurality of outlines can be executed at an extremely high speed.

(Reversing process+storage line+painting process)

FIG. 9 shows a constructional block diagram for executing the process shown in FIG. 8 mentioned above.

FIG. 9 is a block diagram for explaining a construction of an image processing apparatus showing an embodiment of the invention, in which the similar parts and components as those shown in FIG. 1 are designated by the same reference numerals. Reference numeral 1 denotes the-designation means for designating a closed figure to be painted by a code or for designating a closed figure drawn by the display 5. Reference numeral 2 indicates the outline data memory. A plurality of outline data constructing a closed figure are stored as vector data in the memory 2. Or, the vector data of a closed figure drawn by the display 5 is stored in the memory 2. The vector data of a closed figure to be painted is output to the reversal and painting means 3 by a code input from the designation means 1 or by an instruction of a figure by a cursor or the like.

The reversal and painting means 3 sequentially reverses write dots in the pattern memory 4 which faces one outline which is specified by the vector data along the storage direction and writes the reversed dots through storage control means 8 and stores the black dots into the area in the closed figure in the pattern memory 4, thereby executing the painting process. Deriving means 7 is used to obtain a storage axis to determine the reversing direction from the outline data in the outline data memory 2. The coordinate data of the storage axis (reference storage line data) is transferred to the storage control means 8.

The storage control means 8 stores from both directions the reversed write dot data of each line which is-output from the reversal and painting means 3 so as to face the storage axis which is presumed by the reference storage line data derived. Then, the storage control means 8 stores the black dots into the-closed figure in the pattern memory 4, thereby executing the printing process.

The reversal and painting process denotes that each dot data A in the pattern memory 4 is reversed (1→0, 0→1) and rewrites the reversed dot data into the pattern memory 4.

The printer 6 prints the dot data stored in a bit map in the pattern memory 4 as a dot image.

Practically speaking, W(width) and H(height) of a storage area based on a size of figure to be painted are set into the bit map memory RAM 26*a* as a storage work memory in the character generator 26. For instance, in the case where a character pattern having the frame of 128×128 dots is formed from the vector font data, W=128 and H=128. At this time, the deriving means 7 is used to calculate a position MID (refer to FIG. 10) of W/2 for instance, 128/2) from the width of each scanning line. In the actual reversing process, when the reversal and painting means 3 executes the reversing process while tracing the outline, if the outline points are located on the left side than the position MID, the reversing direction is determined to the right direction, and if the outline points are located on the right side than the position MID, the reversing direction is decided to the left direction by the storage control means 8. The reversal and painting means 3 executes the reversing process until the position MID. Assuming that the process which is executed in the right direction is called a first reversing process, it is similar to that shown in FIG. 3 and its description is omitted. Another embodiment of the invention will be further described hereinbelow with reference to FIGS. 10(*a*) to (*f*) and FIG. 11.

FIG. 10(*a*) is a diagram for explaining an example of a closed figure to be reversed and painted. Reference numeral 81 denotes a closed figure which is constructed by outlines 81*a* to 81*d*.

FIGS. 10(*b*) to (*f*) are diagrams for explaining the second reversal and painting processing state according to the invention. FIG. 10(*b*) shows a state before writing and corresponds to the state in which the initialization was executed and all "0" was set. On the other hand, at this time point, the position MID (middle line in the embodiment) of the storage area is derived by the deriving means 7. (c) in FIG. 10 shows a reversal and painting state at the first time and corresponds to the state in which the data was reversed and stored until the position MID from the right direction of x with respect to the outline 81*a*. FIG. 10(*d*) shows a reversal and painting state at the second time and corresponds to the state in which the data was reversed and stored with respect to the outline 81*b*. In this case, since the outline 81*b* rides over the position MID (the outline 81*b* crosses on both sides of the position MID), the reversing direction is changed to the left direction of x from this time point. FIG. 10(*e*) shows a reversal and painting state at the third time and corresponds to the state in which the data was reversed and stored with respect to the outline 81*c*. FIG. 10(*f*) shows a reversal and painting state at the fourth time and corresponds to the state in which the data was reversed and stored with respect to the outline 81*d*.

FIG. 11 is a flowchart for explaining an example of the second reversal and painting processing procedure according to the invention. Reference numerals (1) to (10) denote processing steps, respectively.

First, the apparatus waits until the reversal and painting means 3 receives the character size and outline data (1). If the reversal and painting means 3 has received them, the width and height of a storage area are set into the bit map memory RAM 26a (2) and the inside of the storage area is all set to "0" (3). Next, the position MID is derived by the deriving means 7 (4) and informed to the storage control means 8. Then, the storage control means 8 discriminates whether an objective outline is located on the right side than the position MID or not (5). If YES, the processing routine advances to step (8) and subsequent steps. If NO, the reversal and painting means 3 starts the reversal and painting process for one outline to be painted in the x direction and the right direction (6). The apparatus waits until the reversal and painting process is executed until the position MID (7). If the reversal and painting process has been completely executed until the position MID, the reversal and painting means 3 starts the reversal and painting process for one objective outline in the x direction and left direction (8). The apparatus waits until the reversal and painting process is executed until the position MID and to the first dot (9). If the reversal and painting process has completely been performed until the position MID and to the first dot, a check is made to see if the reversal and painting process has been completed for all of the outlines or not (10). If YES, the processing routine is finished. If NO, the processing routine is returned to step (6) and the reversal and painting process of the closed figure is continued.

As compared with the reversal and painting method (the first reversing process) shown in FIG. 3, even in the same reversing method, by setting the position MID and reversing the area from the outline point to the position MID (in this case, the middle point), the number of reversing times is extremely reduced and the processing speed can be remarkable improved.

Therefore, the painting process can be completed at a further higher speed than the case of the embodiment shown in FIGS. 2 and 3. The printing speed and display speed can be extremely improved. However, if the data is reversed twice on the middle line, that is, on the virtual axis, the portion on the axis is blanked. Therefore, the reversing process on the virtual axis is executed only in the case of scanning from the left side.

The position of the middle line is not limited to the ½ position but can be set at any position in the bit map memory RAM 26a. For instance, if the minimum and maximum values in the x direction of the painting data of the vector data are obtained and the line which passes through the points between the minimum and maximum values and is parallel with the y axis is set to the middle line (position MID), a possibility in which the area out of the painting area is reversed can be reduced, so that the processing speed can be generally raised.

As described above, the present invention in this aspect comprises: a pattern memory to store a dot pattern; reversal and painting means for sequentially reversing dots in the pattern memory on the basis of vector data corresponding to outlines which construct a closed figure, for writing the reversed dots, and for painting the area in the closed figure; deriving means for deriving reference storage line data in the pattern memory; and storage control means for storing from both directions the reversed write dot data of each line which is output from the reversal and painting means so as to face a storage axis which is presumed by the reference storage line data derived by the deriving means. Therefore, as compared with the conventional closed figure painting process, painting can be executed at a high speed by an extremely simple circuit. On the other hand, since the area into which the reversed write dot data is stored can be limited into the closed figure range, the vain reversal and writing process can be omitted.

Therefore, the painting process of a closed geometrical figure or the area in the vector font which is specified by a plurality of outlines can be executed at an extremely high speed and the painting process of the inside area can be completed in a short time.

(Example in which the reversing process is switched in accordance with the kind of image area)

FIG. 12 is a block diagram for explaining a construction of an image processing apparatus showing an embodiment of the invention. Reference numeral 101 denotes a designation means for inputting a code of a figure to be painted to a standard figure (closed polygonal figure) memory 102. To construct the closed polygonal figure, outline data and its attribute data (for instance, the number of outline points and the like) have been stored in the standard figure (closed polygonal figure) memory 102. Reference numeral 103 denotes a discrimination means for extracting the attribute data of the closed polygonal figure selected from the standard figure memory 102 and outputting painting processing means selection data to selection means 105.

Reference numeral 104 denotes a painting processing section comprising first painting means 104a, second painting means 104b, and third painting means 104c. In a work memory 104d, the first painting means 104a calculates the exclusive ORing of a painting pattern which has previously been stored with the outline data, thereby executing the painting process. Then, the first painting means 104a outputs the painted figure data to the selection means 105. The work memory 104d to store the dot image of at least one character exists in the painting processing section 104. The work memory 104d is divided and used as necessary for storage of the dot image of one character which was painted and formed by the first to third painting means 104a to 104c, an outline table, storage of a painting pattern, and the like. The selection means 105 transfers the transmitted dot image or outline table to storage means 106 or a pattern memory 107, which will be explained hereinlater.

The second painting means 104b stores the outline data which was read out of the standard figure memory 102 as a bit map into the work memory 104d. Further, the second painting means 104b converts the "0" bits between the "1" bit and the "1" bit which were detected by line processing the readout outline data into the "1" bits and executes the painting process and outputs the painted figure data to the selection means 105.

The third painting means 104c makes an outline table in the work memory 104d on the basis of the outline data which was read out of the standard figure memory 102 and outputs the painting data corresponding to the outline table to the selection means 105. Reference numeral 106 denotes the storage means. The selection means 105 selects either one of the painted figure data which are output from the first to third painting means 104a to 104c on the basis of the painting means selection data which is output from the discrimination means 103 and outputs the selected painted figure data to the storage means 106. The storage means 106 stores the output painting figure data into the pattern memory 107 as a bit map in accordance with the painting system.

Reference numeral 108 denotes a display for displaying the figure pattern stored in the pattern memory 107 to a bit map. A printer 109 prints the figure pattern which was stored as a bit map in the pattern memory 107 onto a recording medium as a dot image.

The operation will now be described.

When the painting process of a closed figure is executed and the code of the figure stored in the standard figure memory 102 is input from the designation means 101, the discrimination means 103 discriminates the attribute of the closed figure. On the basis of the result of the discrimination, the selection means 105 selects either one of the outputs of the first to third painting means 104a to 104c. The selecting conditions include the degree of difficulty of the shape of the outline data, size (figure area), the number of pointed vertexes, and the like. In general, when the figure area is sufficiently large, the third painting means 104c is selected. When the figure area is relatively small or the number of pointed vertexes is large (in the case where the number of outline points which cross the scanning line is a large odd number), the first painting means 104a is selected. When the figure area size is medium or when the degree of difficulty of the shape of the outline data is high, the second painting means 104b is selected. The closed figure pattern which is output from the selected painting means is stored as a dot pattern into the pattern memory 107 by the storage means 106. The stored dot pattern is displayed as a bit map on the display 108 or printed as a dot image by the printer 109.

On the other hand, as selecting conditions, in the case of the vector font (the outline of a character is defined by vectors), if the radical of the vector font is complicated like the second standard of the JIS code, the first painting means 104a is selected. If the vector font is simple like a symbol or parentheses, the second painting means 104b is selected.

Further, if a change request to enlarge the character size is generated, the third painting means 104c is preferentially selected.

Figure 13:
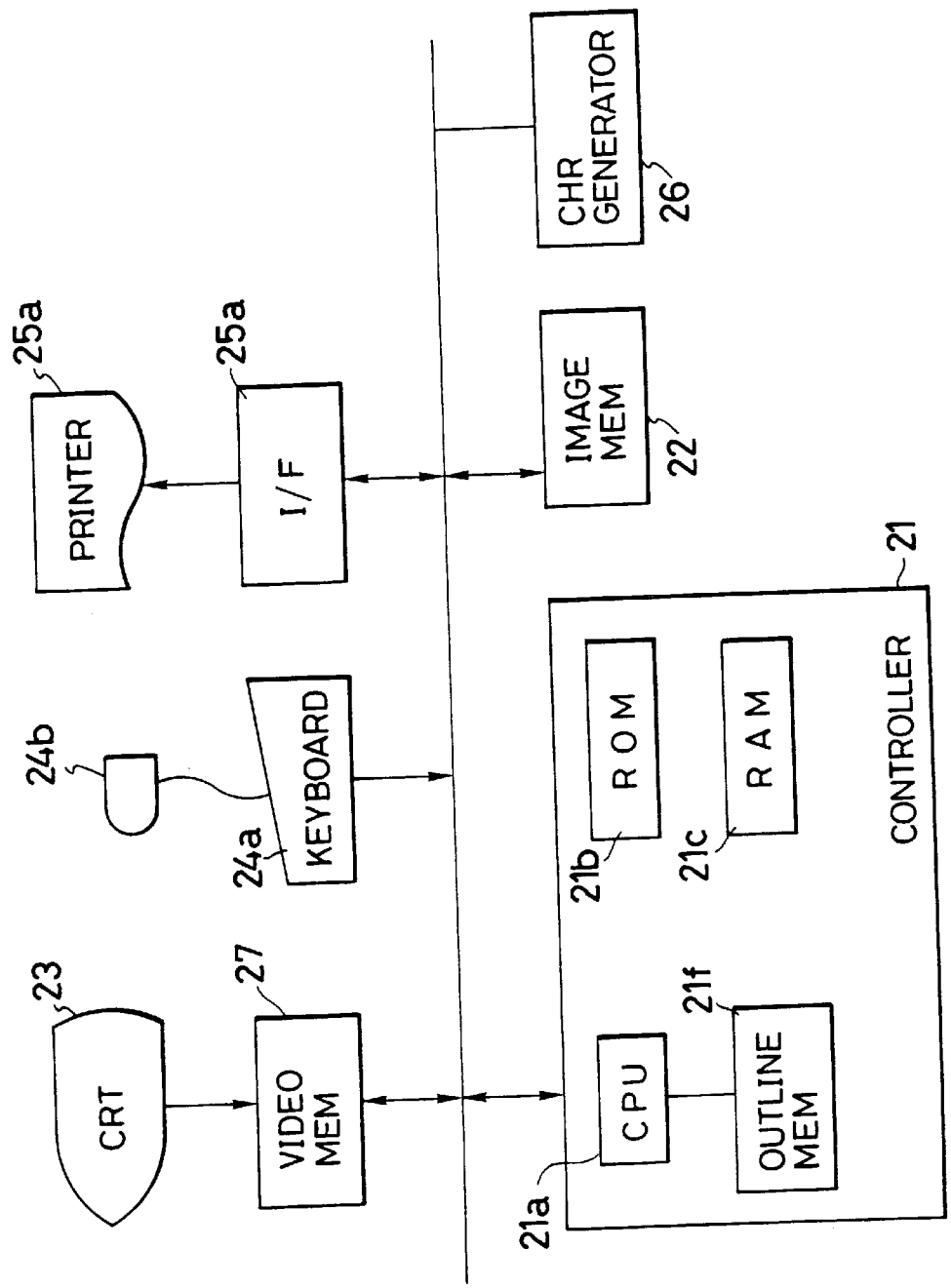
FIG. 13 is a block diagram of a document processing apparatus based on FIG. 12.
Figure 16:
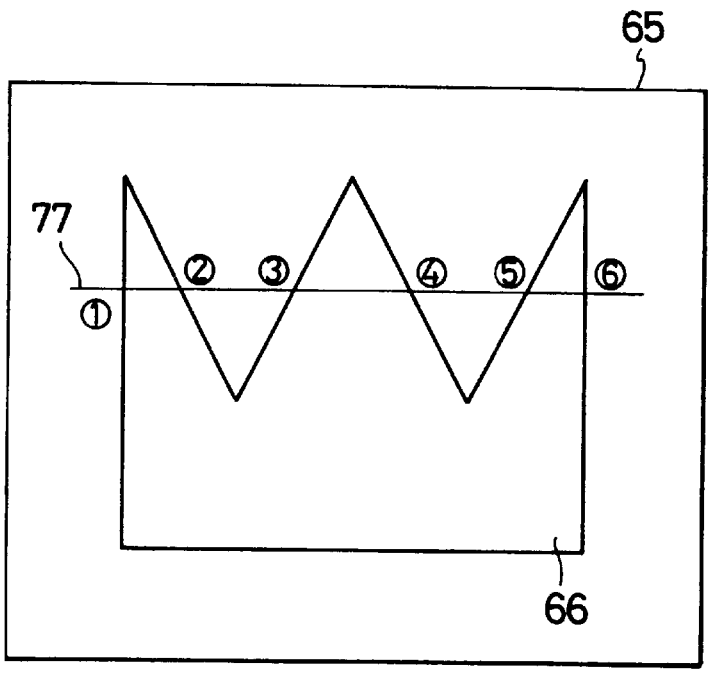
FIG. 16 is a diagram for explaining the principle of the painting process of a closed figure.
Figure 17:
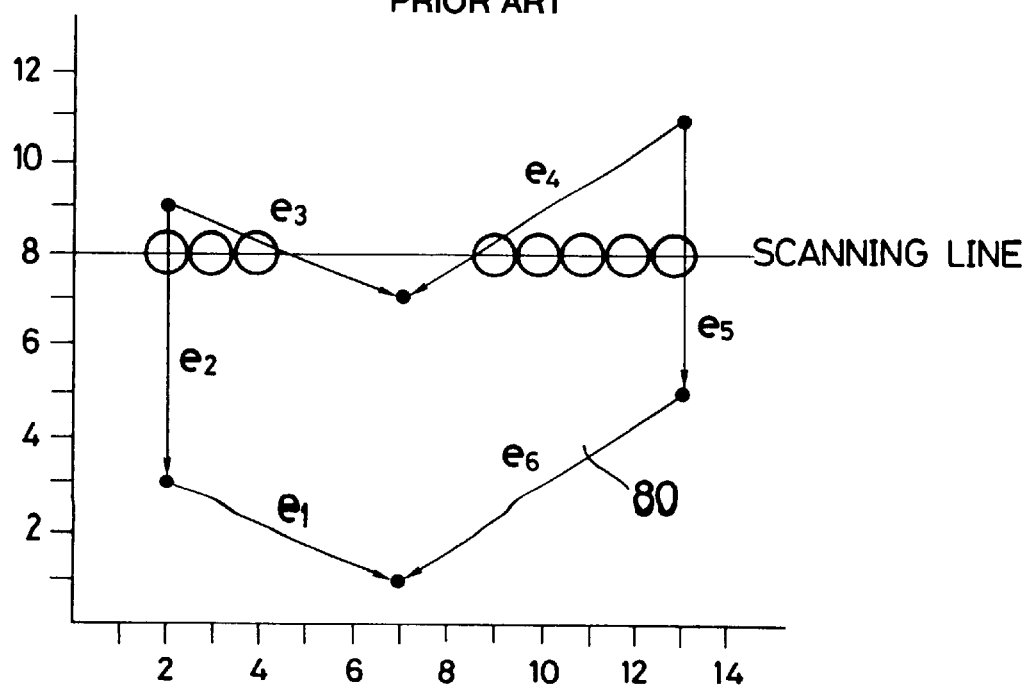
FIG. 17 is a diagram for explaining a painting process by an outline table.
Figure 18:
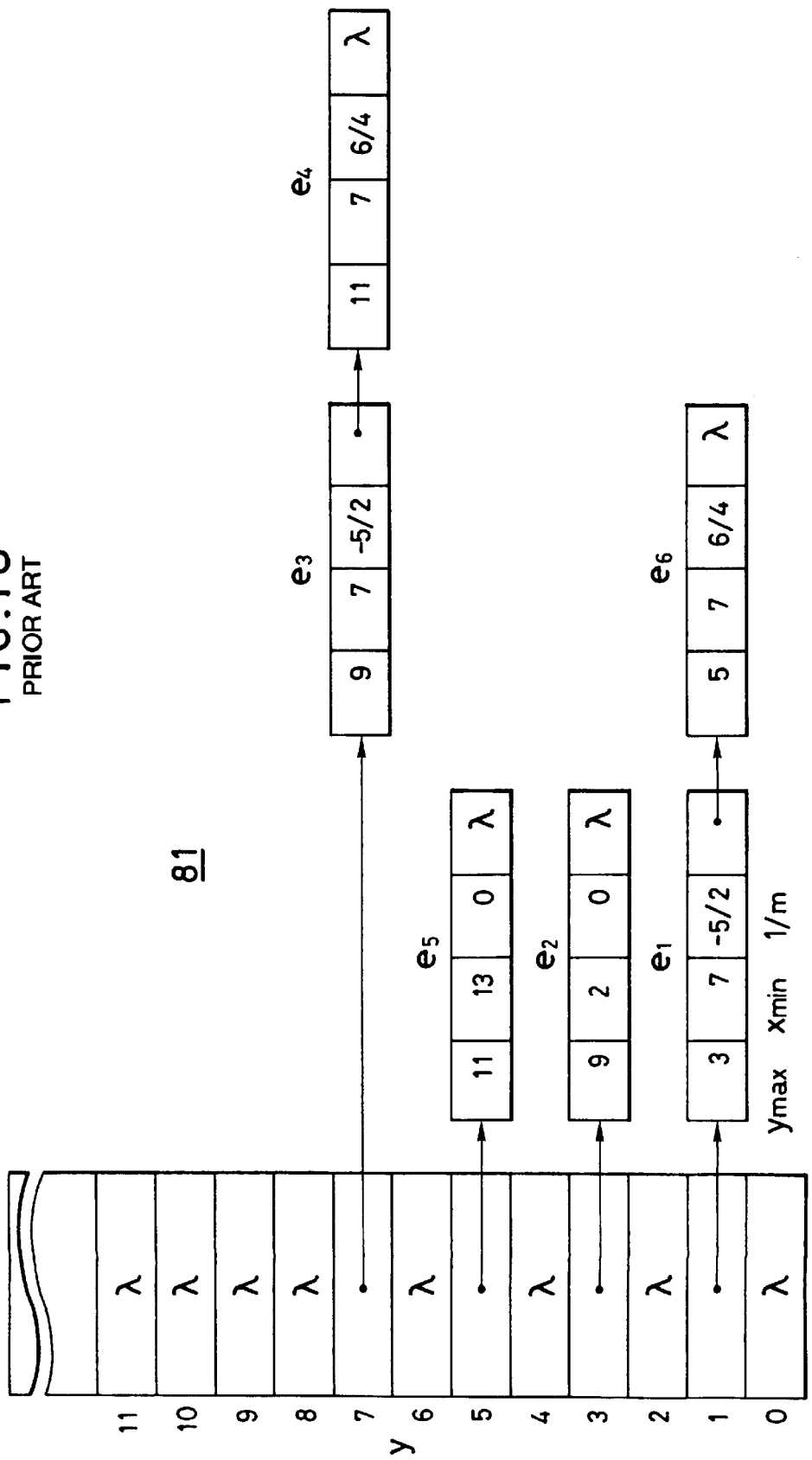
FIG. 18 is an explanatory diagram showing an outline table.

FIG. 13 is a block diagram showing an example of a document apparatus for generating the vector font based on the outline data in a manner similar to FIG. 5. Reference numeral 21 denotes the controller comprising: the CPU 21a such as a microcomputer or the like; the ROM 21b in which a control program (a flowchart of FIG. 14 or the like which will be explained hereinlater) for the CPU 21a, various data, and the like have been stored; the RAM 21c to temporarily store various data as a work area of the CPU 21a; the font memory (outline data memory) 21e; and the like. The font data of characters and the like corresponding to the character codes and vector fonts (vector data indicative of the outlines of characters) have been stored in the font memory 21e together with the attribute data. A work area (work memory 104d in FIG. 12) to store the dot image of one character of the 128 point size is always provided in the RAM 21c. A desired character is generated to the work memory 104d by the first to third painting means 104a to 104c.

Reference numeral 22 denotes the image memory which is constructed as a bit map. A dot image of a character is stored into the image memory 22. The CRT 23 displays the bit image stored in the video memory 27 at a high accuracy. The printer 25a prints the dot image received through the interface 25b.

The keyboard 24a and pointing device 24b construct the designation means of the document processing apparatus and functions as a data input source.

The process to switch and select the painting means according to the invention will now be described with reference to FIG. 14.

FIG. 14 is a flowchart for explaining an example of a processing procedure to switch and select the painting means from the character size data by applying the invention. Reference numerals (1) to (20) show processing steps, respectively.

First, the apparatus waits until a character code is input from the keyboard 24a, an external memory (not shown), or a host (not shown) (1). If the character code has been input, an outline data memory 21f is accessed (2) and the attribute data and outline data are output to the discrimination means 103 and painting processing section 104 (3).

Next, a check is made to see if the attribute data has been received or not (4). If YES, the analysis of the attribute data is started (5). A check is made to see if the character size is equal to or smaller than, for instance, the 64 point size or not (6). If NO, a check is made to see if the character size is equal to or smaller than, for instance, the 128 point size or not (7). If NO, this means that the character size is larger than the 128 point size, so that the third painting means 104c is selected and an outline table is formed in the work memory 104d (9). Then, the data is stored into the pattern memory 107 in accordance with the outline table (10). The vector font data formed is then displayed as a bit map by the CRT 23 (11). A check is then made to see if a print command has been input or not (12). If YES, the printing process is executed (13) and the processing routine is finished.

On the other hand, if YES in step (7), this means that the character size is larger than the 64 point size and is equal to or smaller than the 128 point size. Therefore, the second painting means 104b is selected (14) and dots of the outline are stored into the work memory 104d (15). The "0" bits between the "1" bit and the "1" bit of the line output among the bits of the outline are reversed to 1+"1" bits (16) and stored into the pattern memory 107. Then, the processing routine is returned to step (11).

On the other hand, if YES in step (6), since the character size is the small size, the first painting means 104a is selected (17). The outline data of one character is loaded into the work memory No. 1 (18). The painting pattern is stored into the work memory No. 2 in the RAM 21c (19). Then, the exclusive OR (EXOR) of the pattern in the work memory No. 2 and the data in the work memory No. 3 is calculated while tracing the outline by using the data in the work memory No. 1 and stored into the work memory No. 3 in the RAM 21c (20). The resultant data is stored into the image memory 22 as the pattern memory 107 or into the video memory 27. The processing routine is returned to step (11).

Thus, the optimum painting means painting means corresponding to the object to be painted and the attribute of the closed figure (including the vector font) can be selected. The painting process which is difficult to be executed by only single painting means can be always executed by the optimum painting system.

Although the embodiment has been described with respect to an example in the case of the processes of the apparatus for processing a character comprising vector fonts, if a closed figure is defined as vector data, the invention can be also applied to even a character or a pure polygonal figure.

As described above, the invention comprises: a plurality of painting means for executing the painting process of the area in a closed figure on the basis of the outline data of the closed figure; a pattern memory to store either one of closed figure patterns which are painted by the plurality of painting means; discrimination means for discriminating the figure attribute of the closed figure; selection means for selecting either one of the painting means on the basis of the figure attribute data discriminated by the discrimination means; and storage means for storing into the pattern memory the closed figure pattern which is output from the painting means selected by the selection means. Therefore, the optimum painting process based on the figure attribute can be selected and a figure pattern which is difficult to process by the single painting means can be also painted and output at a high speed.

As described in detail above, according to the invention, it is possible to provide an image processing apparatus having reversal and painting means for sequentially reversing write dots in a pattern memory along a storage direction in correspondence to one outline which is specified by vector data, for writing the reversed write dots, and for painting the area in a closed figure.

According to the invention, it is possible to provide an image processing apparatus in which by sequentially reversing write dots (data) in a pattern memory until a predetermined storage line in correspondence to one outline which is specified by vector data, the area in a closed figure can be painted at a high speed by a simple construction.

According to the invention, it is possible to provide an image processing apparatus in which the attribute of an image to be painted is discriminated, and a method of a painting process can be selectively switched.

what is claimed is:

1. A figure processing apparatus comprising:
    a plurality of painting means for painting a closed figure based on outline data of the closed figure;
    selecting means for selecting one of said plurality of painting means based on an output size of the closed figure; and
    developing means for developing a closed figure pattern to be output in a pattern memory using said one painting means selected by said selecting means,
    wherein said selecting means selects (a) a first one of said plurality of painting means if the output size is equal to or smaller than a first size, said first painting means painting the closed figure by writing an outline based on the figure outline and by executing an exclusive OR operation in a predetermined direction from a position on the written outline in a predetermined pattern, (b) a second one of said plurality of painting means if the output size is larger than the first size and equal to or smaller than a second size, said second painting means painting the closed figure by writing an outline based on the figure outline and by executing a painting operation between the written outlines, and (c) a third one of said plurality of painting means if the output size is larger than the second size, said third painting means painting the closed figure by making an outline table and by executing a painting operation based on the made outline table.

2. An apparatus according to claim 1, further comprising printing means for printing the closed pattern developed by said developing means.

3. An apparatus according to claim 1, further comprising display means for displaying the closed pattern developed by said developing means.

4. A method performed in a figure processing apparatus having a plurality of painting means for painting a closed figure based on outline data of the closed figure, said method comprising the steps of:
    selecting one of the plurality of painting means based on an output size of the closed figure; and
    developing a closed figure pattern to be output in a pattern memory using the selected one painting means,
    wherein said selecting step includes selecting (a) a first one of the plurality of painting means if the output size is equal to or smaller than a first size, the first painting means painting the closed figure by writing an outline based on the figure outline and by executing an exclusive OR operation in a predetermined direction from a position on the written outline in a predetermined pattern, (b) a second one of the plurality of painting means if the output size is larger than the first size and equal to or smaller than a second size, the second painting means painting the closed figure by writing an outline based on the figure outline and by executing a painting operation between the written outlines, and (c) a third one of the plurality of painting means if the output size is larger than the second size, the third painting means painting the closed figure by making an outline table and by executing a painting operation based on the made outline table.

5. A method according to claim 4, further comprising the step of printing the developed closed figure pattern.

6. A method according to claim 4, further comprising the step of displaying the developed closed figure pattern.

7. A computer-useable medium storing computer-useable instructions for controlling a figure processing apparatus having a plurality of painting means for painting a closed figure based on outline data of the closed figure, the instructions comprising:
    instructions for selecting one of the plurality of painting means based on an output size of the closed figure; and
    instructions for developing a closed figure pattern to be output in a pattern memory using the selected one painting means,
    wherein said selecting instructions include selecting (a) a first one of the plurality of painting means if the output size is equal to or smaller than a first size, the first painting means painting the closed figure by writing an outline based on the figure outline and by executing an exclusive OR operation in a predetermined direction from a position on the written outline in a predetermined pattern, (b) a second one of the plurality of painting means if the output size is larger than the first size and equal to or smaller than a second size, the second painting means painting the closed figure by writing an outline based on the figure outline and by executing a painting operation between the written outlines, and (c) a third one of the plurality of painting means if the output size is larger than the second size, the third painting means painting the closed figure by making an outline table and by executing a painting operation based on the made outline table.

8. A medium according to claim 7, further comprising instructions for printing the developed closed figure pattern.

9. A medium according to claim 7, further comprising instructions for displaying the developed closed figure pattern.

10. A character processing apparatus, comprising:
    first generation means for generating character pattern data on the basis of vector data through a first painting process;
    second generation means for generating character pattern data on the basis of vector data through a second painting process;
    discrimination means for discriminating whether a character to be output has a size larger than a predetermined value or a size equal to or smaller than the predetermined value; and
    selection means for selecting said first generation means when said discrimination means discriminates that the character has a size equal to or smaller than the predetermined value, and for selecting said second generation means when said discrimination means discriminates that the character has a size larger than the predetermined value.

11. An apparatus according to claim 10, further comprising print means for printing a character on the basis of the character pattern data generated by the one of said first and second generation means selected by said selection means.

12. An apparatus according to claim 10, further comprising display means for displaying a character on the basis of the character pattern data generated by the one of said first and second generation means selected by said selection means.

13. An apparatus according to claim 10, wherein said first generation means generates the character pattern data by converting a character outline of vector data to a character outline of bit map data and by painting an inside of the character outline of bit map data, and wherein said second generation means forms an outline table on the basis of vector data and generates the character pattern data on the basis of the formed outline table.

14. A character processing apparatus, comprising:
 first generation means for generating character pattern data on the basis of vector data through a first painting process;
 second generation means for generating character pattern data on the basis of vector data through a second painting process;
 discrimination means for discriminating whether or not a character to be output is of a first type; and
 selection means for selecting said first generation means when said discrimination means discriminates that the character is of the first type, and for selecting said second generation means when said discrimination means discriminates that the character is not of the first type.

15. An apparatus according to claim 14, further comprising print means for printing a character on the basis of the character pattern data generated by the one of said first and second generation means selected by said selection means.

16. An apparatus according to claim 14, further comprising display means for displaying a character on the basis of the character pattern data generated by the one of said first and second generation means selected by said selection means.

17. An apparatus according to claim 14, wherein said first generation means generates the character pattern data by forming a character outline from vector data and by painting an inside of the character outline in a predetermined direction beginning from a position on the character outline, and wherein said second generation means generates the character pattern data by converting a character outline of vector data to a character outline of bit map data and by painting the inside of the character outline of bit map data.

18. An apparatus according to claim 14, wherein said discrimination means discriminates that the character is of the first type if the character is based on the second standard of JIG code.

19. A character processing method, comprising the steps of:
 a first step of generating character pattern data on the basis of vector data through a first painting process;
 a second step of generating character pattern data on the basis of vector data through a second painting process;
 a step of discriminating whether a character to be output has a size larger than a predetermined value or a size equal to or smaller than the predetermined value; and
 a step of selecting said first generating step when said discriminating step discriminates that the character has a size equal to or smaller than the predetermined value, and selecting said second generating step when said discriminating step discriminates that the character has a size larger than the predetermined value.

20. A method according to claim 19, wherein said first generating step generates the character pattern data by converting a character outline of vector data to a character outline of bit map data and by painting an inside of the character outline of bit map data, and wherein said second generating step forms an outline table on the basis of vector data and generates the character pattern data on the basis of the formed outline table.

21. A character processing method, comprising:
 a first step of generating character pattern data on the basis of vector data through a first painting process;
 a second step of generating character pattern data on the basis of vector data through a second painting process;
 a step of discriminating whether or not a character to be output is of a first type; and
 a step of selecting said first generating step when said discriminating step discriminates that the character is of the first type, and selecting said second generating step when said discriminating step discriminates that the character is not of the first type.

22. A method according to claim 21, wherein said first generating step generates the character pattern data by forming a character outline from vector data and by painting an inside of the character outline in a predetermined direction beginning from a position on the outline, and wherein said second generating step generates the character pattern data by converting a character outline of vector data to a character outline of bit map data and by painting an inside of the character outline of bit map data.

23. A method according to claim 21, wherein said discriminating step discriminates that the character is of the first type if the character is based on the second standard of JIS code.

24. A computer-useable medium storing computer-useable instructions for executing a character processing method, the instructions comprising:
 first instructions for generating character pattern data on the basis of vector data through a first painting process;
 second instructions for generating character pattern data on the basis of vector data through a second painting process;
 instructions for discriminating whether a character to be output has a size larger than a predetermined value or a size equal to or smaller than the predetermined value; and
 instructions for selecting said first instructions when said discriminating instructions discriminate that the character has a size equal to or smaller than the predetermined value, and for selecting said second instructions when said discriminating instructions discriminate that the character has a size larger than the predetermined value.

25. A medium according to claim 24, wherein said first instructions generate the character pattern data by converting a character outline of vector data to a character outline of bit map data and by painting an inside of the character outline of bit map data, and wherein said second instructions form an outline table on the basis of vector data and generate the character pattern data on the basis of the formed outline table.

26. A computer-useable medium storing computer-useable instructions for executing a character processing method, the instructions comprising:

first instructions for generating character pattern data on the basis of vector data through a first painting process;

second instructions for generating character pattern data on the basis of vector data through a second painting process;

instructions for discriminating whether or not a character to be output is of a first type; and instructions for selecting said first instructions when said discriminating instructions discriminate that the character is of the first type, and for selecting said second instructions when said discriminating instructions discriminate that the character is not of the first type.

27. A medium according to claim 26, wherein said first instructions generate the character pattern data by forming a character outline from vector data and by painting an inside of the character outline in a predetermined direction beginning from a position on the outline, and wherein said second instructions generate the character pattern data by converting a character outline of vector data to a character outline of bit map data and by painting an inside of the character outline of bit map data.

28. A medium according to claim 26, wherein said discriminating instructions discriminate that the character is of the first type if the character is based on the second standard of JIS code.

\* \* \* \* \*

UNITED STATES PATENT AND TRADEMARK OFFICE
CERTIFICATE OF CORRECTION

PATENT NO.    : 6,057,825
DATED         : May 2, 2000
INVENTOR(S)   : HIROSHI TAKAKURA ET AL.

It is certified that error appears in the above-identified patent and that said Letters Patent is hereby corrected as shown below:

ON THE TITLE PAGE [57] ABSTRACT:

Line 12, "optimum." should read --optimum--.

COLUMN 1:

Line 31, "explaning" should read --explaining--; and
    Line 60, "pid" should read --pixel--.

COLUMN 2:

Line 16, "into the" should read --into--;
    Line 17, "process" should read --the process--;
    Line 18, "in," should read --in--;
    Line 40, "was" should read --uses--;
    Line 58, "16" should read --6--; and
    Line 64, "into the" should read --into--.

COLUMN 3:

Line 3, "the-case" should read --the case--;
    Line 11, "c" should read --a--;
    Line 12, "a-problem" should read --a problem--; and
    Line 21, "becoes" should read --becomes--.

UNITED STATES PATENT AND TRADEMARK OFFICE
CERTIFICATE OF CORRECTION

PATENT NO.   : 6,057,825
DATED        : May 2, 2000
INVENTOR(S)  : HIROSHI TAKAKURA ET AL.

It is certified that error appears in the above-identified patent and that said Letters Patent is hereby corrected as shown below:

COLUMN 5:

Line 15, "lid." should read --11d--;
    Line 24, "3)(b)." should read --3(b)).--; and
    Line 49, "FIGS." should read --¶ FIGS.--.

COLUMN 6:

Line 32, "display" should read --displays--.

COLUMN 7:

Line 22, "8,)" should read --8.).--; and
    Line 49, "the-designation" should read --the designation--.

Figure 10A:
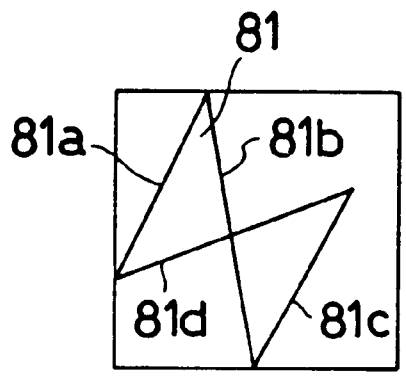
FIG. 10 is a diagram showing a reversal process using a storage line.
Figure 10B:
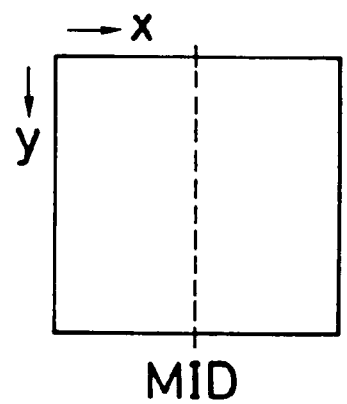
Figure 10C:
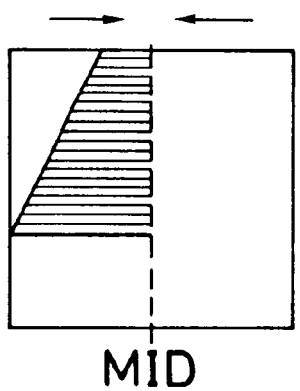
Figure 10D:
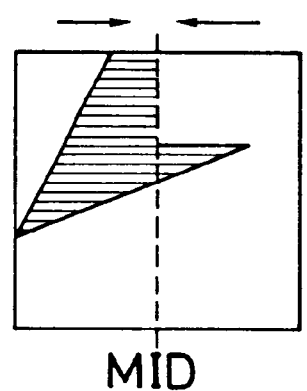
Figure 10E:
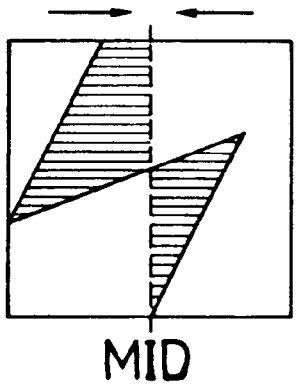
Figure 10F:
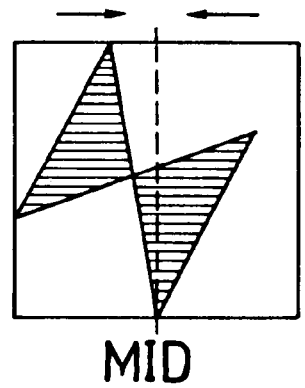

COLUMN 8:

Line 9, "the-closed" should read --the closed--; and
    Line 50, "FIG. 10" should read --FIG. 10(c)--.

COLUMN 12:

Line 28, "t+"1"" should read --"1"--.

UNITED STATES PATENT AND TRADEMARK OFFICE
CERTIFICATE OF CORRECTION

PATENT NO.   : 6,057,825

DATED        : May 2, 2000

INVENTOR(S)  : HIROSHI TAKAKURA ET AL.

It is certified that error appears in the above-identified patent and that said Letters Patent is hereby corrected as shown below:

COLUMN 13:

Line 21, "what" should read --What--.

Signed and Sealed this

Third Day of April, 2001

Attest:

NICHOLAS P. GODICI

*Attesting Officer*    Acting Director of the United States Patent and Trademark Office